Sept. 24, 1940.  G. B. McWILLIAMS  2,215,557
SHOE REPAIRING SOLE TRIMMER
Filed June 29, 1939   2 Sheets-Sheet 2
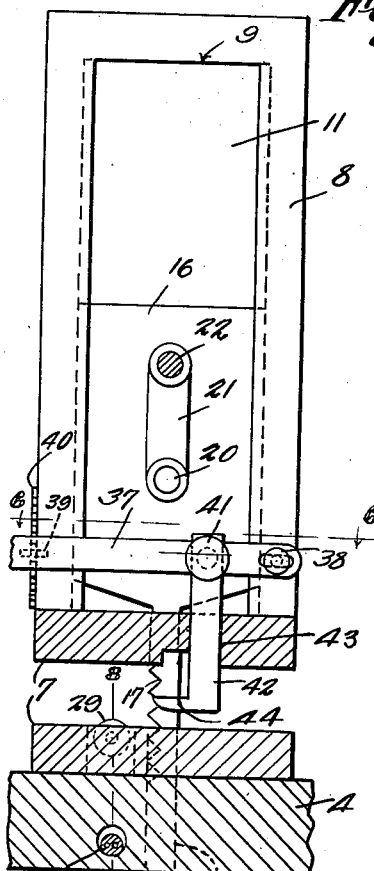
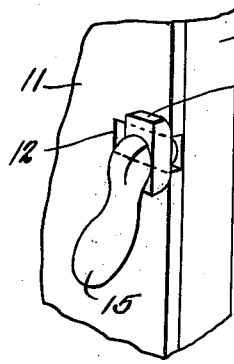
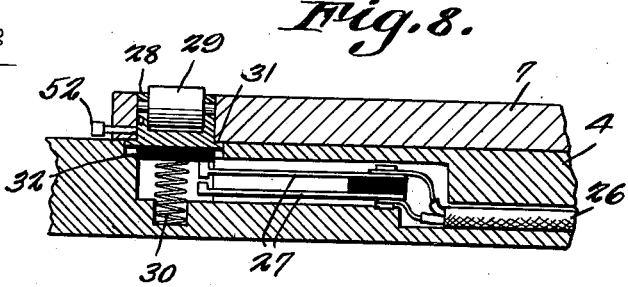
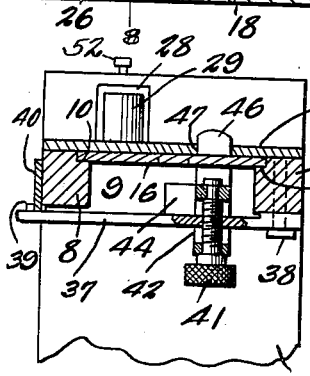
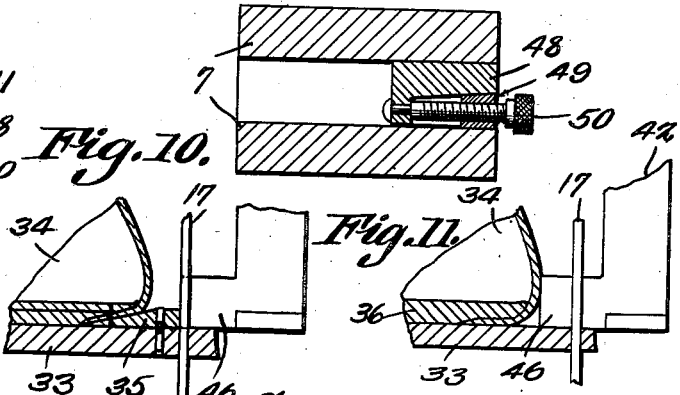
G. B. McWilliams
INVENTOR.
BY *Asnow Co.*
ATTORNEYS.

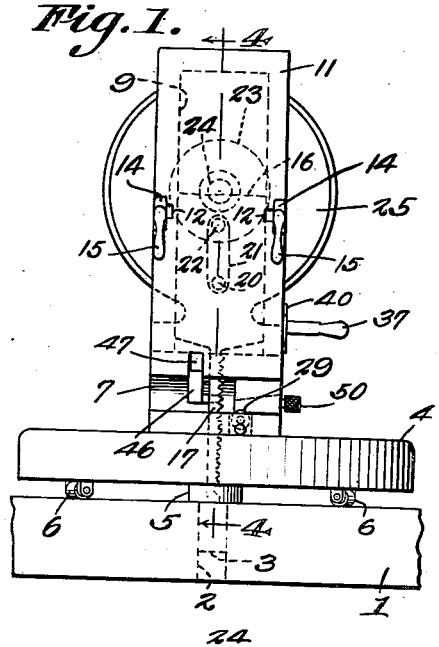

Patented Sept. 24, 1940

2,215,557

UNITED STATES PATENT OFFICE 2,215,557

SHOE REPAIRING SOLE TRIMMER

George Bernard McWilliams, Olney, Ill.

Application June 29, 1939, Serial No. 282,002

4 Claims. (Cl. 12—85)

This invention aims to provide a simple means for trimming the soles of articles of footwear, after the soles have been attached to the uppers, the machine being adapted, also, for use in cutting leather and the like into pieces for the formation of soles. The invention aims to provide novel means for reciprocating the element whereby the leather is cut. Another object of the invention is to supply novel means whereby the cutting element will be prevented from engaging and damaging the upper of the shoe.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in front elevation, a device constructed in accordance with the invention;

Fig. 2 is a side elevation;

Fig. 3 is a top plan;

Fig. 4 is a section on the line 4—4 of Fig. 1;

Fig. 5 is a section on the line 5—5 of Fig. 4;

Fig. 6 is a section on the line 6—6 of Fig. 5;

Fig. 7 is a perspective view showing the means whereby the face plate is securely but releasably held in place;

Fig. 8 is a section on the line 8—8 of Fig. 5;

Fig. 9 is a section on the line 9—9 of Fig. 2;

Figs. 10 and 11 are sectional views illustrating the operation of the spacer which holds the saw spaced from the upper of the shoe. The numeral 1 marks a support, such as a work table, having a vertical opening 2, receiving a depending pivot element 3 on one end of a base 4, the pivot element having a collar 5 which spaces the base 4 from the support 1. Near its rear end, the base 4 is supplied with castors 6, adapted to roll on the support 1. The entire structure hereinafter described may be swung readily about a vertical axis, represented by the pivot element 3, to position the machine properly, as light conditions and the nature of the work in hand may demand.

The lower arm of a U-shaped bracket 7 is secured to the base 4, the lower arm of the bracket 7 being longer than the upper arm thereof. At its end, the upper arm of the bracket 7 carries a vertical standard 8, provided with an opening 9. On its front side, the standard 8 has a guideway 10. On the front of the standard 8 is located a cover plate 11 provided in its opposite edges with notches 12 adapted to receive buttons 14 pivotally mounted on the standard 8 and operated by means of handles 15. When the buttons 14 are disposed lengthwise of the notches 12, the cover plate 11 can be put on or taken off, but when the buttons 14 are crosswise of the notches 12 as shown in Fig. 7, the cover plate is held in place. The removable cover plate gives access to certain working parts of the machine, hereinafter described.

The working parts last above referred to include a slide 16, mounted to reciprocate vertically in the guideway 10, behind the cover plate 11. A severing element 17, preferably a saw, is formed integrally with the lower end of the slide 16, the saw being mounted for reciprocation at the end of the upper arm of the bracket 7, and being received for reciprocation in a slot 18 formed in the base 4.

As to the means for imparting reciprocation to the slide 16 and the saw 17, Fig. 4 shows that the slide has a rearwardly projecting stud 20, whereon is pivoted a pitman 21, located in the opening 9 of the standard 8, and pivoted at its upper end on a wrist pin 22, secured to a crank disk 23, attached, in any desired way, to the shaft 24 of an electric motor 25, mounted on the upper arm of the bracket 7.

The circuit conductors 26 for the motor 25 extend into the base 4 and are connected to resilient switch tongues 27 secured within the base 4, the switch tongues being normally spaced apart, and the motor circuit being open. A carrier 28 is mounted for vertical movement in the lower arm of the bracket 7, as Fig. 8 shows, and is located closely adjacent to the saw 17, a little in front of the saw, as shown in Fig. 2. In the carrier 28, a roller 29 is journaled. The carrier 28 and the roller 29 are raised by a compression spring 30 (Fig. 8) located within the base 4 and insulated at 32 from the carrier. The upward movement of the carrier 28 and the roller 29 is limited by a flange 31 on the carrier 28 and engaging the lower arm of the bracket 7. The insulation 32 for the spring 30 engages the upper tongue of the switch 27.

The sole 33 (Figs. 10 and 11) which is attached to the shoe upper 34 may vary in thickness, and in order to prevent vertical movement of the shoe sole, whilst the saw 17 is working, a vertically adjustable presser foot mechanism is provided. It is desirable, also, to space the saw 17 horizontally from the shoe upper 34, whilst the sole 33 is being trimmed, in order that the upper may not be cut by the saw. The presser foot mechanism, therefore, is adjustable horizontally. Sometimes, as shown in Fig. 10, the shoe may have a welt 35, for engagement with the presser foot and guiding mechanism, and, again, as shown in Fig. 11, if the shoe has no welt, the upper 34 is pushed inwardly over the insole 36, and, then, the guiding and spacing and presser foot mechanism is engaged with the upper 34, at the edge of the insole 36. In any event, as shown in Figs. 10 and 11, there is no opportunity for the shoe to be pushed to the right in Figs. 10 and 11, until the upper 34 is cut by the saw 17.

As to the mechanism last above referred to, it will be observed that an adjusting device, such as a lever 37, is located behind the standard 8, and is fulcrumed at one end, as indicated at 38, on the standard. Near its free end, as shown in Fig. 6, the lever 37 has a tooth 39, the lever being resilient enough so that this tooth can be engaged with a rack plate 40 on one edge of the standard 8.

Into the lever 37 is threaded a headed adjusting screw 41, held for rotation but against longitudinal movement in forks at the upper end of a slide 42, mounted for vertical adjustment and for horizontal adjustment from front to back in an opening 43 formed in the upper arm of the bracket 7. At its lower end, the slide 42 has a horizontal presser foot 44, adapted to bear on or engage the upper surface of the sole 33. The vertical adjustment of the foot 44 is brought about by swinging the lever 37 up and down, and engaging the tooth 39 with the rack plate 40. Thus, shoe soles of different thicknesses may be accommodated readily. As shown in Fig. 4, the upper arm of the bracket 7 is recessed at 45, to receive the presser foot 44, when the slide 42 is raised. The slide 42 has a forwardly extended spacing tongue 46, mounted for vertical adjustment in an opening 47 formed in the cover plate 11, and in the upper arm of the bracket 7, as shown in Fig. 1. The end of the spacing tongue 46 is adapted to ride against the upper 34 as in Fig. 11, or against the welt 35, as in Fig. 10, and, thus, the saw 17 is held spaced, horizontally, from the upper 34.

In practical operation, the shoe is mounted in place as shown in Figs. 10 and 11, the tongue 46 engaging either the upper 34 as in Fig. 11, or the welt 35 as in Fig. 10, to space the saw 17 from the upper 34. Reciprocation is imparted to the saw 17 from the motor 25 by the crank disk 23, the pitman 21 of Fig. 4, and associated parts. When the shoe is shifted with respect to the reciprocating saw 17, the edge of the sole 33 will be trimmed off properly. Horizontal adjustment of the spacing tongue 46 is brought about by turning the adjusting screw 41, the slide 42 and associated parts being shifted horizontally.

When the shoe is mounted in place, as indicated in Figs. 10 and 11, the shoe comes into contact with the roller 29, the carriage 28 is shoved downwardly, the switch tongues 27 are closed together, and the circuit 26 for the motor 25 is closed. The motor 25, therefore, is put into operation so soon as the shoe is placed for cutting, and when the shoe is removed, the circuit 26 is opened, and the motor 25 ceases to reciprocate the slide 16 and the saw 17.

It is desirable to sustain the upper and lower arms of the bracket 7, so that, by no possibility, can the upper arm of the bracket spring vertically with respect to the lower arm. With this end in mind, a brace block 48, shown best in Fig. 9, is introduced between the upper and lower arms of the bracket 7. A wedge 49 is slidably mounted in the brace block 48 and is adapted to engage the lower arm of the bracket 7. The wedge 49 is moved in and out by an adjusting screw 50, threaded into the wedge 49 and held for rotation, but against endwise movement, in the block 48. It can be seen that by advancing the wedge 49, the brace block 48 and the wedge will be made thoroughly effective to sustain the upper arm of the bracket 7.

The brace block 48 and the wedge 49 have another and important function. It will be noted, referring to Fig. 1, that the upper arm of the bracket 7 is provided upon one edge with a scale 51. The brace block 48 can be placed anywhere along the scale 51 and be held by advancing the wedge 49 through the instrumentality of the screw 50. When the brace block 48 is properly positioned, pieces of sole material can be cut before they are attached to the shoe, the edge of the material riding along the front surface of the brace block 48, and the saw 17 being reciprocated.

The operation of the device has been set forth hereinbefore, in connection with the various component parts of the machine, but by way of recapitulation, it will be understood that the sole is trimmed by means of the reciprocating saw 17. Sole leather of a different thickness is accommodated by adjusting the slide 42 and the presser foot 44, through the instrumentality of the lever 37. The horizontal adjustment of the slide 42 and the spacing tongue 46 is brought about by rotating the screw 41 of Fig. 6. The brace block and guide 48 can be moved anywhere along the scale 51 and be held in adjusted position by means of the wedge 49. The motor circuit 26 is opened and closed without any attention on the part of the operator, other than placing the sole of the shoe on the roller 29 of Fig. 8.

Referring to Figs. 8 and 2 of the drawings, it will be noted that a latch 52 is provided, the latch preferably being in the form of a headed pin, mounted for right-line sliding movement in the end of the lower arm of the bracket 7. Figure 8 shows that the carrier 28 is supplied with a seat, shaped for the reception of the inner end of the latch 52. The operator can depress the carrier 28 to close the switch 27 and energize the motor 25. The latch 52 is advanced into engagement with the seat of the carrier 28, and since the carrier cannot rise, responsive to the thrust of the spring 30, the switch 27 remains closed, and the motor 25 energized, so long as continuous operation of the machine is desired.

Having thus described the invention, what is claimed is:

1. In a mechanism for trimming shoe-sole material, a frame, a sole-trimmer movably mounted on the frame, a member comprising a presser foot and a lateral spacer, mechanism for adjusting said member longitudinally, to cause the presser foot to cooperate with sole material of different thicknesses, and mechanism for adjusting said member transversely, to cause the spacer to engage a part of the shoe and hold the trimmer out of engagement with the upper of a shoe whilst the trimmer is operating on the sole of the shoe, the last specified mechanism comprising a lever fulcrumed on the frame, and means for pivoting said member to the lever, the last-specified means being a screw forming a threaded connection between said member and the lever.

2. In a machine for trimming shoe-sole material, a frame, a sole-trimmer movably mounted on the frame, a member comprising a presser foot and a lateral spacer, mechanism for adjusting said member longitudinally, to cause the presser foot to cooperate with sole material of different thicknesses, and mechanism for adjusting said member transversely, to cause the spacer to engage the part of a shoe and hold the trimmer out of engagement with the upper of a shoe, whilst the trimmer is operating on the sole of the shoe, the last specified mechanism comprising a lever fulcrumed on the frame, and means for mounting said member on the lever pivotally and for adjustment transversely of the lever.

3. In a machine for trimming shoe-sole material, a U-shaped member having upper and lower arms, the upper arm being provided with an upwardly projecting standard, a trimmer slidably mounted on the standard and in the lower arm, a motor mounted on the upper arm, mechanism for connecting the motor operatively with the trimmer, a circuit for the motor, and a switch interposed in said circuit, the switch being mounted on the lower arm of said member and being engageable by a shoe, to open and close the circuit, when the shoe is positioned to be operated upon the trimmer.

4. In a machine for trimming shoe-sole material, a U-shaped member having upper and lower arms, a trimmer mounted to reciprocate with respect to said member, one of the arms having a longitudinal scale, an edge stop disposed between the arms and having an index cooperating with the scale to aid in positioning the edge stop, and means for holding the edge stop in adjusted positions longitudinally of the scale, the edge stop constituting, also, a brace preventing relative transverse movement between the arms when the trimmer is reciprocated.

GEORGE BERNARD McWILLIAMS.